(12) United States Patent
Sisto

(10) Patent No.: US 9,453,524 B2
(45) Date of Patent: Sep. 27, 2016

(54) MECHANICALLY BIASED CANTILEVER FASTENER ASSEMBLY

(71) Applicant: WINGIT INNOVATIONS, LLC, Bradley Beach, NJ (US)

(72) Inventor: Salvatore Sisto, Bradley Beach, NJ (US)

(73) Assignee: WINGIT INNOVATIONS, LLC, Bradley Beach, NJ (US)

( * ) Notice: Subject to any disclaimer, the term of this patent is extended or adjusted under 35 U.S.C. 154(b) by 510 days.

(21) Appl. No.: 13/853,750

(22) Filed: Mar. 29, 2013

(65) Prior Publication Data

US 2014/0123468 A1    May 8, 2014

Related U.S. Application Data

(60) Provisional application No. 61/617,349, filed on Mar. 29, 2012.

(51) Int. Cl.
*F16B 13/04* (2006.01)
*F16B 13/08* (2006.01)

(52) U.S. Cl.
CPC ...... *F16B 13/0808* (2013.01); *Y10T 29/49948* (2015.01)

(58) Field of Classification Search
CPC .................. F16B 13/0808; Y10T 29/49948
USPC ................ 411/38, 80.1, 80.2, 80.5, 80.6
See application file for complete search history.

(56) References Cited

U.S. PATENT DOCUMENTS

| | | | | |
|---|---|---|---|---|
| 2,964,989 A | * | 12/1960 | Croessant | 411/38 |
| 3,143,916 A | * | 8/1964 | Rice | 411/37 |
| 3,461,771 A | * | 8/1969 | Briles | 411/34 |
| 3,942,407 A | * | 3/1976 | Mortensen | 411/36 |
| 4,289,062 A | * | 9/1981 | Schiefer | 411/34 |
| 4,875,815 A | * | 10/1989 | Phillips, II | 411/38 |
| 4,920,618 A | * | 5/1990 | Iguchi | 24/453 |
| 5,078,561 A | * | 1/1992 | Wollar et al. | 411/38 |
| 5,205,688 A | * | 4/1993 | Sundstrom | 411/38 |
| 5,944,466 A | | 8/1999 | Rudnicki | |
| 6,007,285 A | | 12/1999 | Sisto | |
| 6,746,191 B2 | * | 6/2004 | Edland | 411/34 |
| 6,857,962 B2 | * | 2/2005 | Weedon | 470/31 |
| 2003/0053881 A1 | * | 3/2003 | Huang et al. | 411/34 |

* cited by examiner

*Primary Examiner* — Gary Estremsky
(74) *Attorney, Agent, or Firm* — Gottlieb, Rackman & Reisman, PC

(57) ABSTRACT

A fastener assembly includes a body, a cup and a faceplate. The fastener assembly is a long thin shape for insertion into an opening in a substrate prior to actuation. Once inserted in the substrate, the fastener assembly may be actuated by the insertion of a bolt into a central aperture in the assembly and the tightening of the bolt against the cup. The actuation of the assembly causes the body of the assembly to fold at four points and to thereby secure the assembly to the substrate.

11 Claims, 9 Drawing Sheets

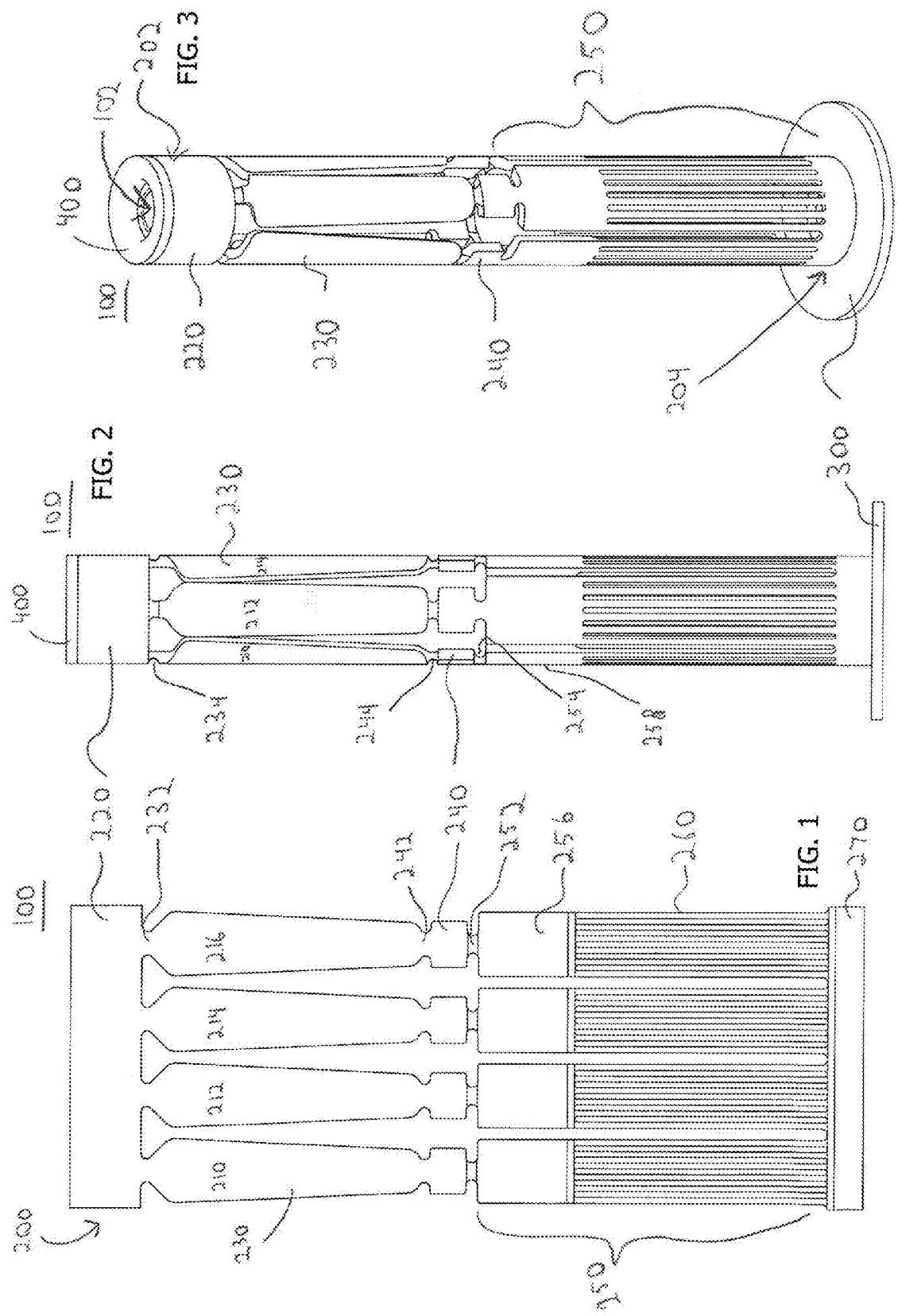

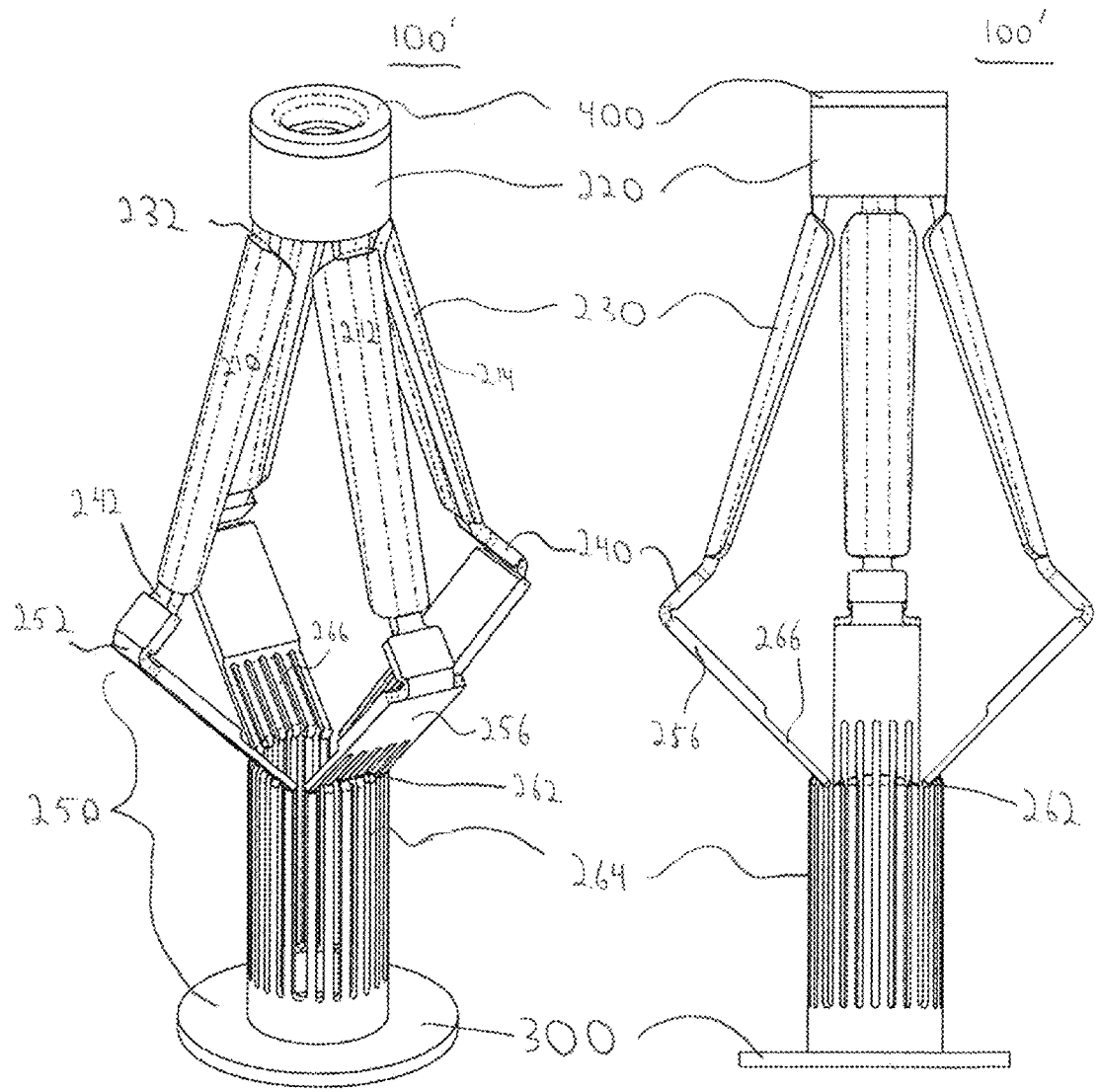

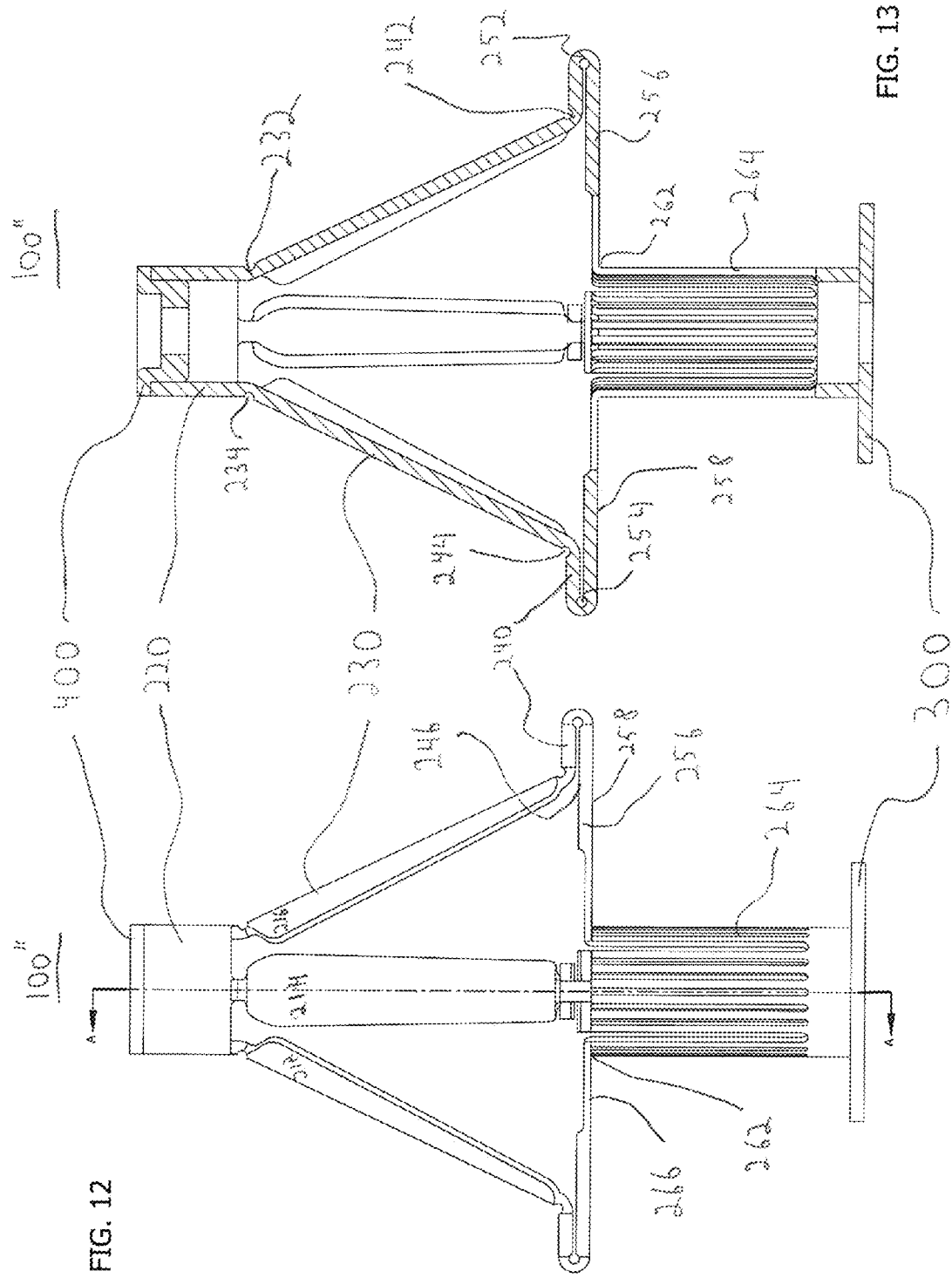

MECHANICALLY BIASED CANTILEVER FASTENER ASSEMBLY

RELATED APPLICATION(S)

This application claims priority to provisional patent application No. 61/617,349, filed on Mar. 29, 2012, which is hereby incorporated by reference.

FIELD OF THE INVENTION

The present invention relates to a fastener assembly that may be inserted into a hollow substrate and be secured to the substrate by expanding in a manner that efficiently distributes forces to the substrate.

BACKGROUND

Applying fasteners to hollow walls or substrate has always been a challenge because of the structural limitations of the substrate and the concentration of forces on the opening in the substrate that the fastener engages. This challenge is increased when there is no access to the opposite side of the substrate.

In particular, because of the limited contact between the fastener and the substrate, the fastener has limited ability to support directional, vibratory, or torque forces.

SUMMARY OF THE INVENTION

A fastener assembly includes a body, a cup and a faceplate. The body further includes three adjustable sections, a wing section, a middle section and a lower section. The lower section further includes a solid portion and a vertical subsection.

The fastener assembly is a long thin shape for insertion into an opening in a substrate prior to actuation. Once inserted in the substrate, the fastener assembly may be actuated by the insertion of a bolt into a central aperture in the assembly and the tightening of the bolt against the cup. The actuation of the assembly causes the body of the assembly to fold at four points.

Once actuated, the cup applies a force on the body in the direction of the faceplate and substrate. The force causes the body to fold outward where the solid portion folds substantially 90° to lock against the substrate. Further, the middle section folds inward against the solid portion with one end of the wing positioned against an intermediary point of the solid portion. This configuration causes a distributed force against the fastener to the substrate by pinning the substrate between the faceplate and the outer surface of the solid portion.

This locking configuration is repeated by a plurality of substantially identical columns that make up the fastener assembly.

DESCRIPTION OF FIGURES

FIG. 1 is a front elevation view of the first example of a cantilever fastener assembly of the present invention, shown prior to assembly;

FIG. 2 is a front elevation view of the first example of a cantilever fastener assembly of the present invention, shown after assembly and prior to actuation;

FIG. 3 is a perspective view thereof;

FIG. 8 perspective view of the first example of a cantilever fastener assembly of the present invention, shown at an intermediary point in the actuation process;

FIG. 9 is a side elevation view thereof;

FIG. 12 is a side elevation view thereof;

FIG. 13 is a cross section view thereof;

DETAILED DESCRIPTION OF THE INVENTION

Figure 14:
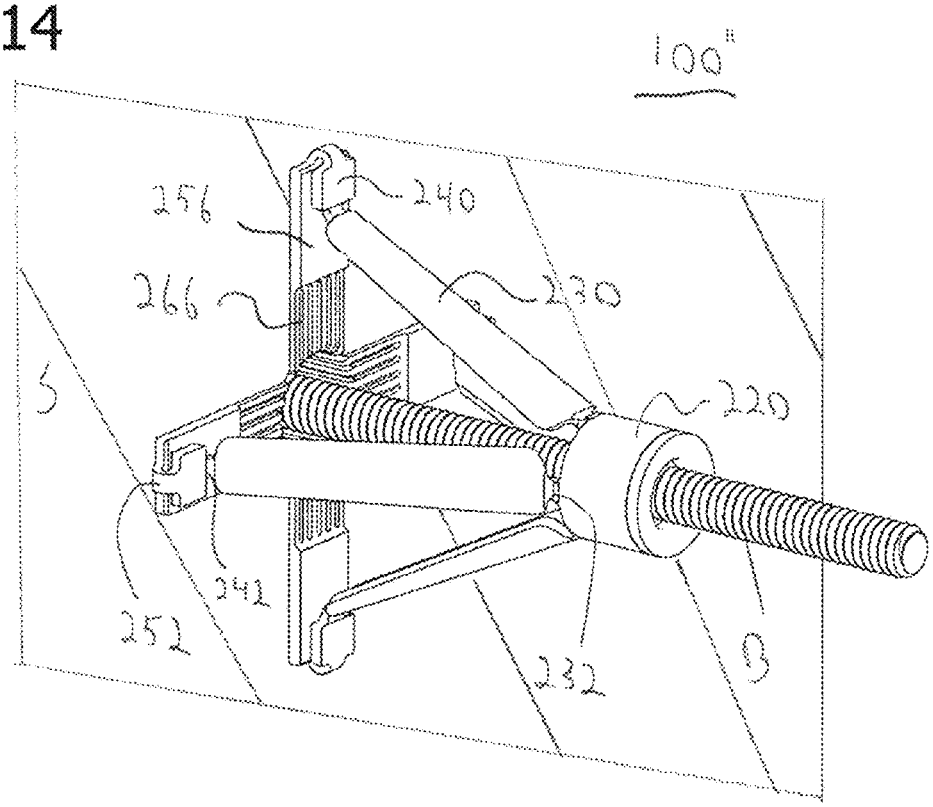
FIG. 14 is a perspective view of first example of a cantilever fastener assembly of the present invention, shown engaged to a bolt after actuation.
Figure 15:
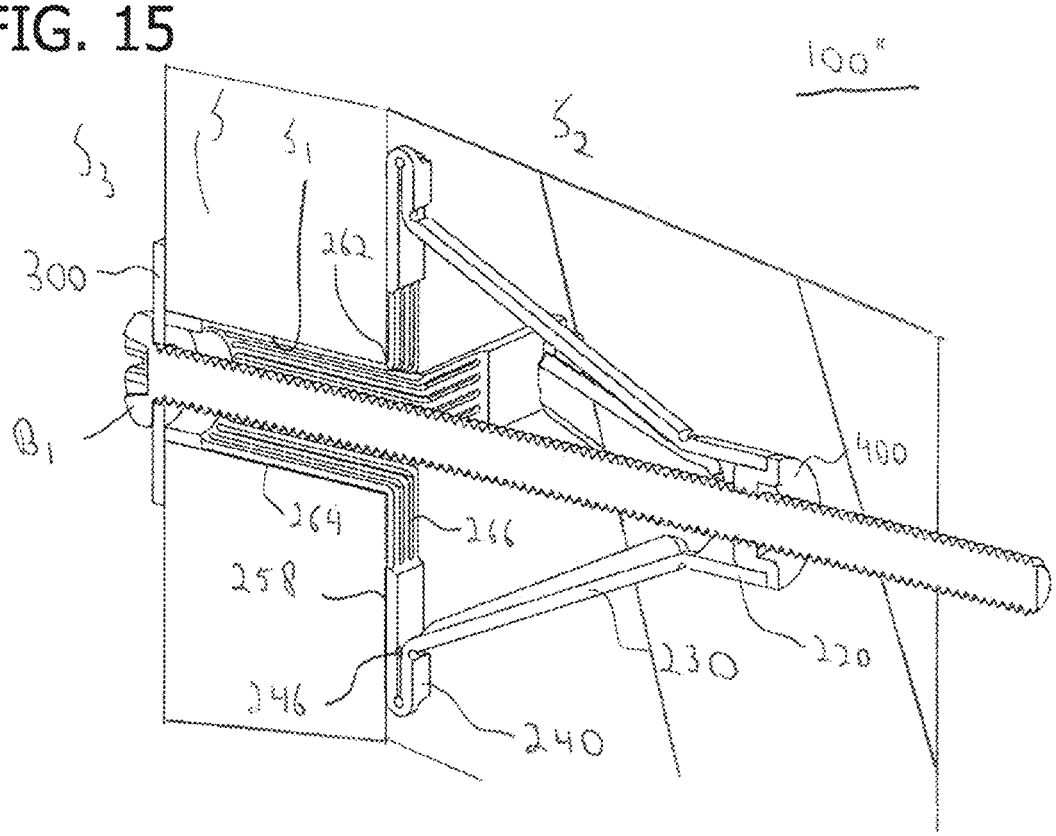
FIG. 15 is a cross section view thereof.
Figure 16:
FIG. 16 is a perspective view of a second example of a cantilever fastener assembly of the present invention.

With reference to FIGS. 1 through 15, there is shown a first example of a cantilever fastener assembly 100 of the present invention. As illustrated in FIG. 1, the assembly is initially formed of an extruded or injection molded sheet having plurality (preferably four) substantially identical columns 210, 212, 214, 216. The columns 210, 212, 214, 216 are wrapped around a central axis to form the pre-installation version of the fastener assembly 100, as shown in FIGS. 2 and 3. After being installed in a wall or substrate S, the fastener assembly 100 is actuated to lock into place in a substrate as shown in FIGS. 14 and 15.

Referring to FIGS. 2 and 3, the fastener assembly 100 includes a body 200, a faceplate 300, and a cup 400. The body includes a proximate end 202 and a distal end 204. The fastener also includes a central aperture 102 for receiving a bolt. The body further includes four substantially identical columns 210, 212, 214, 216, each column including a top section 220, a wing section 230, a middle section 240, and a lower section 250. The top section 220 is connected to the wing section 230 by a first connector 232; the wing section 230 is connected to the middle section 240 by a second connector 242; and the middle section 240 is connected to the lower section 250 by a third connector 252. The lower section 250 further includes a solid portion 256 and a modified portion 260. The lower section 250 of the body 200 connects to the faceplate 300.

The first connector 232, the second connector 242, and the third connector 252 are areas of the four columns 210, 212, 214, 216 that are thinner and more capable of bending. As best shown in FIG. 2, each connector 232, 242, 252 includes a respective cutout 234, 244, 254 that allows the column 210, 212, 214, 216 to bend at the connectors 232, 242, 252. The cutout 234 of the first connector 232 is on the outside of the assembly 100 allowing the wing section 230 to bend outwardly toward the top section 220. The cutout 244 of the second connector 242 is similarly positioned on the outside of the assembly 100 allowing the wing section 230 and middle section 240 to bend outward toward each other. The cutout 254 of the third connector 252 is positioned on the inside of the assembly 100 causing the middle section 240 and the lower section 250 to bend inwardly towards each other.

In alternative examples, other practices, such as thinning of the material or prestressing the material, may be used to provide for the connectors 232, 242, 252. Also, the middle section 240 may be shorter or longer than the examples shown.

As illustrated in FIGS. 1 through 15, the lower section 250 includes two portions, a solid portion 256 and a modified portion 260. In the examples shown the modified portion 260 includes a plurality of slots. Other examples may include different configurations of the modified portion 260, including a two sub-column example, a prestressed example, or a thinned material example. At the distal end 204 of the lower section 250, adjacent the faceplate 300, the modified portion 260 ends and there is a second solid portion 270.

Further shown in FIGS. 2 and 3, the assembly 100 is wrapped into a cylinder having a central aperture 102, where the central aperture 102 is adapted to receive a bolt B. At the proximate end 202 of the assembly 100 is the cup 400 and at the distal end 204 of the assembly is the faceplate 300. In the first example shown in FIGS. 2-15, the cup 400 further includes cup threads 402. In other examples, the cup may include a wire tire, a snap lock, a magnetic, or varying other mechanisms that enable the cup to be pulled towards the faceplate.

In one example of the wire tire, a wire is connected to the cup 400 and extends through the central aperture 102 of the assembly 100 and extends out the faceplate 300. The wire tire may be pulled to generate the force F on the cup 400. In a second example, the wire is pulled from within the fastener by a needle nose (or similar) pliers.

Figure 4:
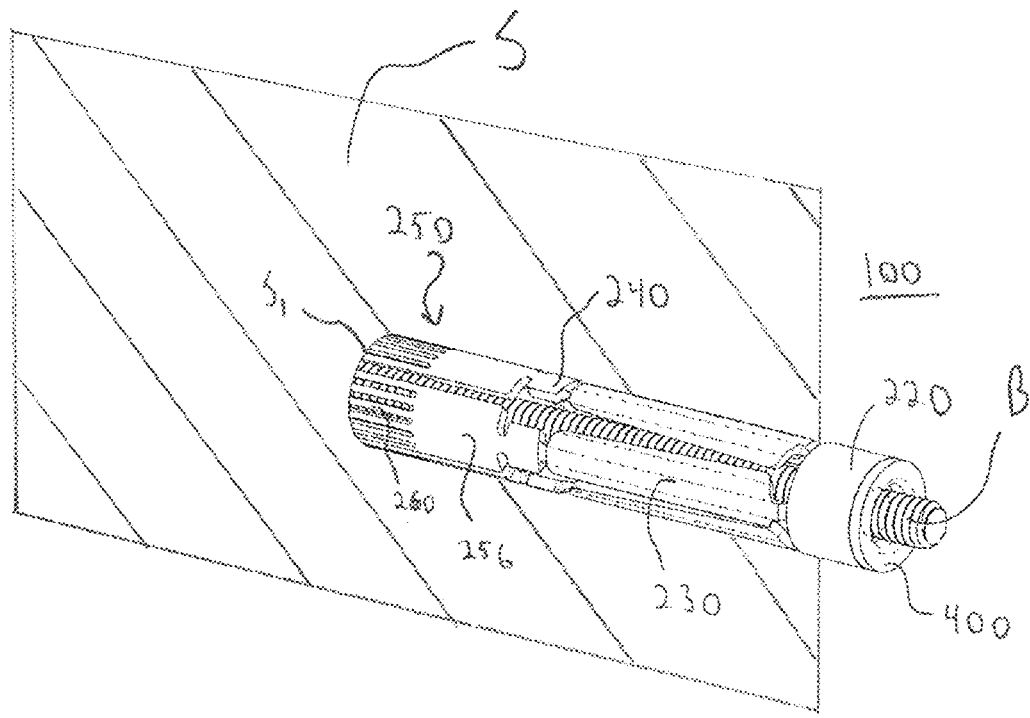
FIG. 4 is a perspective view thereof, with a bolt engaged to the fastener.
Figure 5:
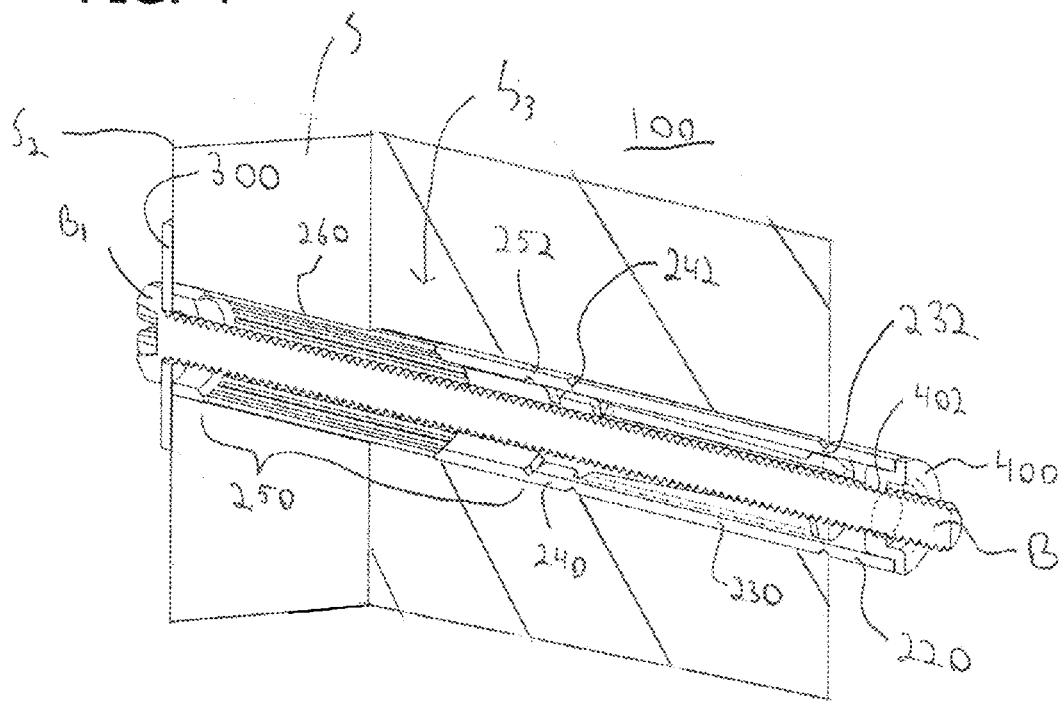
FIG. 5 is a cross section view thereof.

In use, the fastener 100 is inserted, cup 400 first, into an opening $S_1$ in a hollow wall or substrate S. The faceplate 300, which is positioned opposite the cup 400, is wider than the opening $S_1$ and thus does not pass into the opening $S_1$. Prior to actuation, the body 200 is linear as shown in FIGS. 4 and 5. In particular, prior to actuation, the cross section area of the body 200 is limited to approximately the cross section area of the cup 400, allowing the body 200 to pass through an opening $S_1$ having a substantially similar area.

With the fastener 100 inserted into the substrate S, the cup 400 and the body 200 of the assembly 100 are positioned within the substrate S and only the faceplate 300 is left on the outer side of the substrate S, adjacent the substrate opening $S_1$. A threaded bolt B is inserted into the central aperture 102 of the assembly 100, through the space between the four columns 210, 212, 214, 216. The bolt B engages the cup 400 at the cup threads 402 as illustrated in FIGS. 4 and 5.

FIGS. 6 through 10 show the fastener assembly 100' in the process of securing to a substrate S. As the bolt B is tightened, it applies a force F on the cup 400 in the direction of the faceplate 300. This force F actuates the body 200 causing the body 200 to fold as shown in FIGS. 6 through 10. In particular the body 200 folds at four points—the first connector 232, the second connector 242, the third connector 252, and at a bend point 262 in the modified portion 260 of the lower section 250. While the three connectors 232, 242, 252 are all in fixed positions, the bend point 262 has a variable position that is determined by the thickness of the substrate S.

When the bolt B is tightened against the cup 400, the head $B_1$ of the bolt B will be blocked from insertion by the faceplate 300 and further tightening of the bolt B against the threads 402 will create a force F on the cup 400 in the direction of the substrate S. The force F will cause the body 200 of the fastener assembly to fold at the connectors 232, 242, 252 and the bend point 262. As discussed above and as shown by the arrows in FIGS. 6 and 7, the wing section 230 will fold outward towards the top section 220; the middle section 240 will fold outward toward the wing section 230; and the middle section 240 and the lower section 250 will fold inward upon each other.

Figure 6:
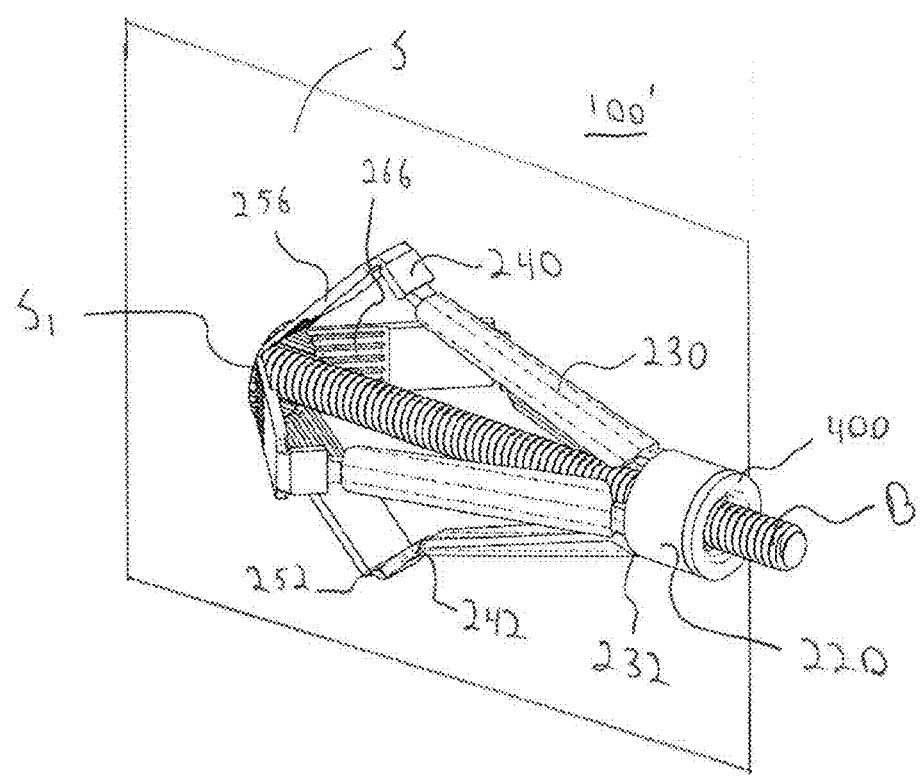
FIG. 6 is a perspective view of the first example of a cantilever fastener assembly of the present invention, shown with a bolt engaged to the fastener and at an intermediary point in the actuation process.
Figure 7:
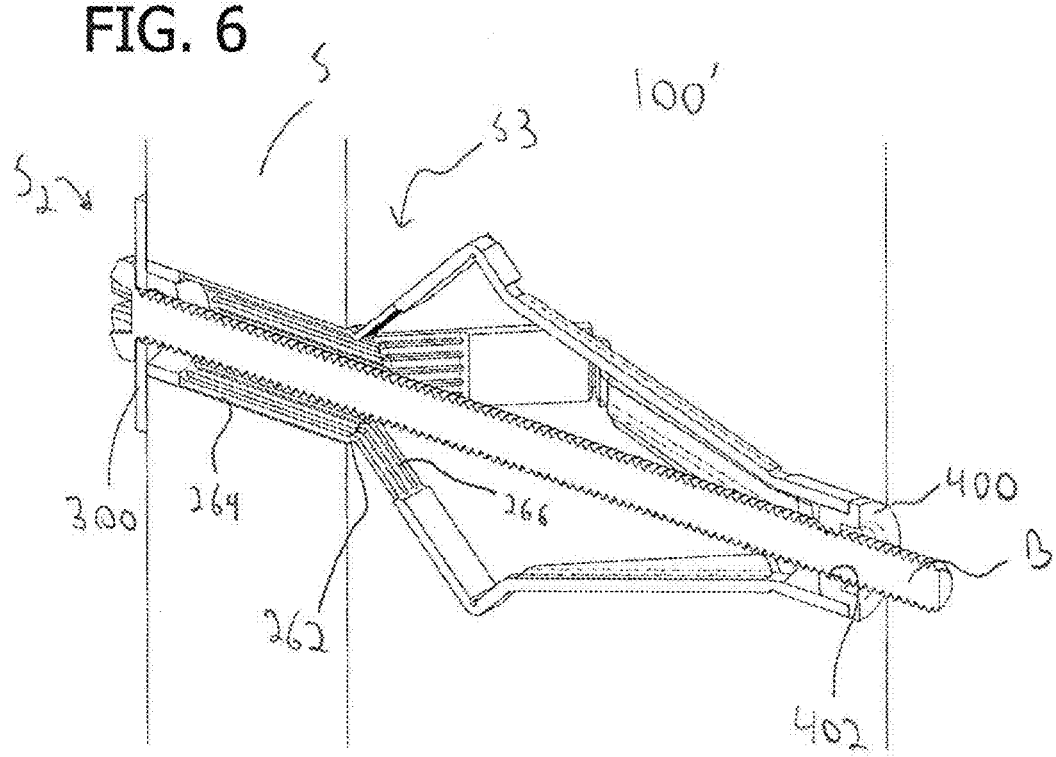
FIG. 7 is a cross section view thereof.
Figure 10:
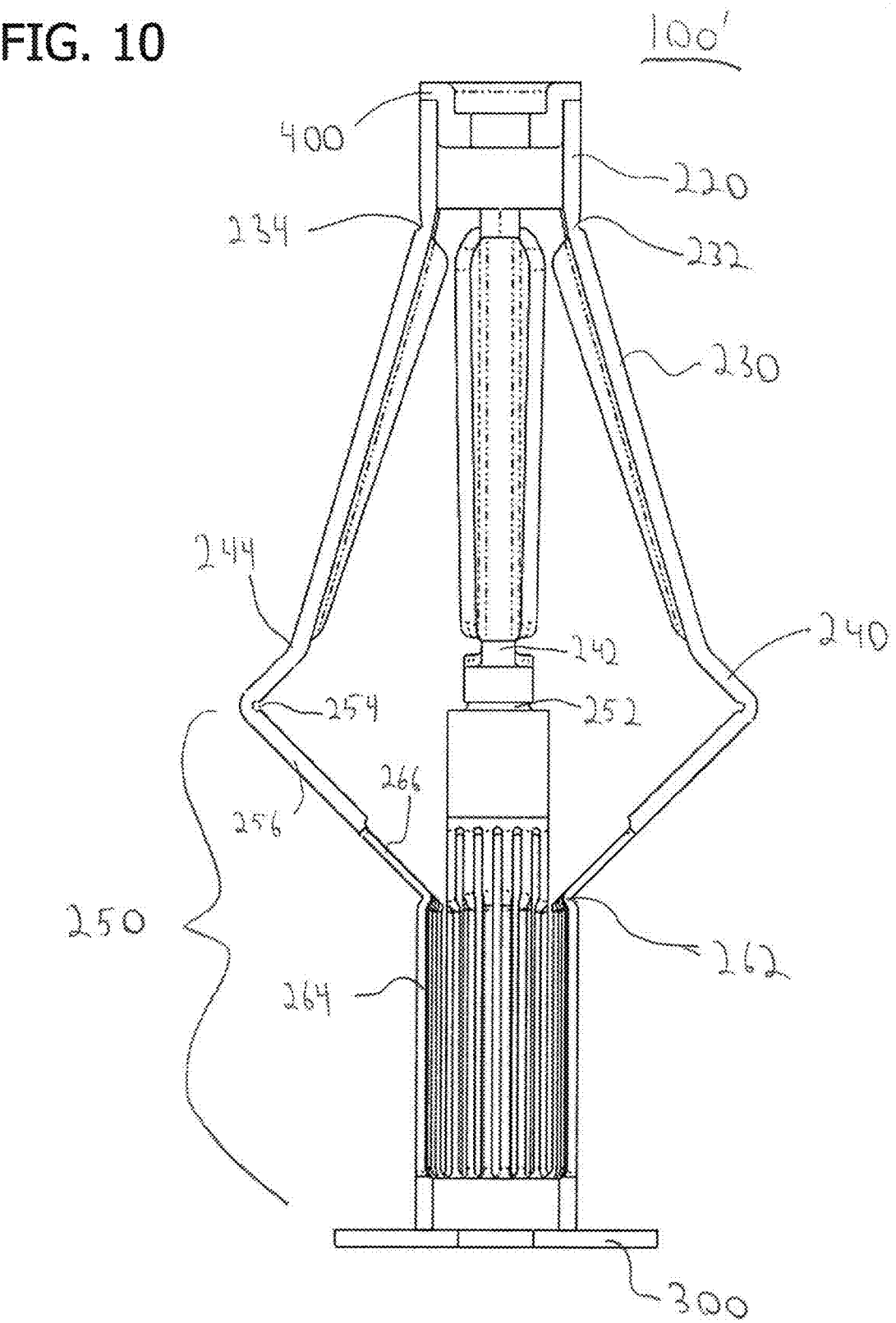
FIG. 10 is a cross section view thereof.
Figure 11:
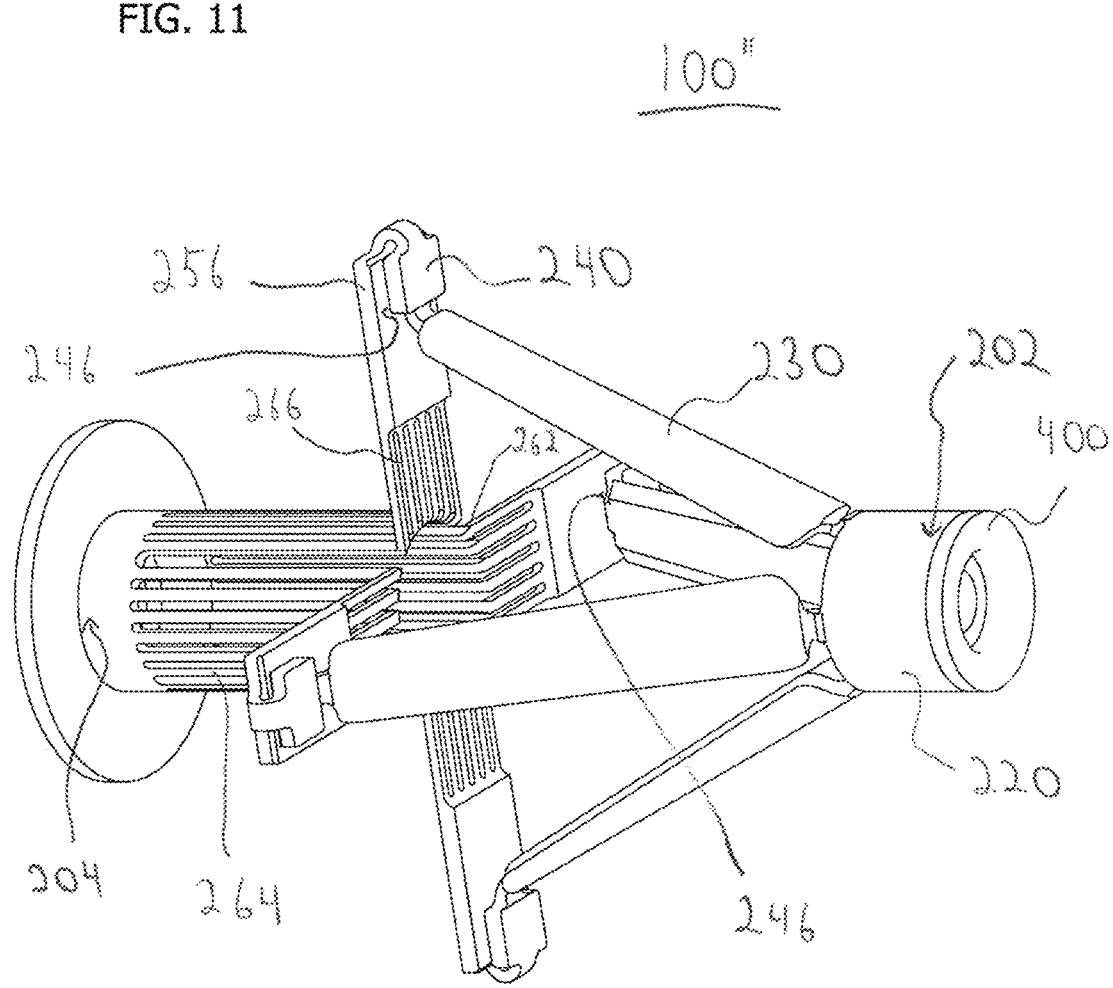
FIG. 11 is a perspective view of a first example of a cantilever fastener assembly of the present invention, shown after actuation.

The lower section 250 will additionally bend outward at the bend point 262, which is a variable location on the modified portion 260. The modified portion 260 is relatively weaker against a sheering force such as the one that will occur when the cup 400 is forced towards the substrate S. As the tightening of the cup 400 forces the modified portion 260 outward, a vertical subsection 264 of the modified portion 260 is held in place by the opening $S_1$ of the substrate S, as seen in FIGS. 6 and 7. A lateral subsection 266 of the modified portion 260 that extends beyond the substrate opening $S_1$ flexes at the bend point 262 and rotates towards the inner surface $S_2$ of the substrate S. As shown in FIGS. 14 and 15, the modified portion 260 wraps around the substrate S at a substantially 90° angle. In another example, the modified portion 260 wraps around the substrate S in an arc and contacts the inside surface of the substrate a point at or near the third connector 252.

FIGS. 14 and 15 show the fastening assembly 100" in a fully actuated position secured to a substrate S. The faceplate 300 is positioned on the outside $S_3$ of the substrate S; and the cup 400, top section 220, wing section 230, middle section 240, and solid portion 256 are all positioned inside of the substrate S. The vertical subsection 264 of the modified portion 260 that did not bend is positioned within the opening $S_1$ of the substrate S.

The actuated fastener 100" of FIGS. 14 and 15 creates a solidification of the substrate opening $S_1$ through the mechanical biasing of the fastener body 200. The fastener 100" is held in place by pinning the substrate S between the faceplate 300 and the outer surface 258 of solid portion 256 of the lower section 250. The actuated fastener 100" provides stable resistance to compression forces, tension forces, and shear forces.

The fastener 100" provides a diffuse surface (solid portion 256) to support the pressure from the wing section 230 caused when a shear force is applied to the fastener 100". In particular, the bolt B exerts an inward force F on the cup 400, which exerts an inward force on the top section 220. The top section 220 exerts an inward force on the wing section 230 which exerts a downward force on the solid portion 256. Because the downward force on the solid portion 256 is centered at an intermediary point 246, the force is distributed more evenly to the surface area of the solid portion 256. The improved distribution of this force creates a better attachment to the substrate S and allows the fastener assembly 100" to withstand greater strain than otherwise.

The attachment of the fastener assembly 100 to the substrate S by pinning the substrate between the outer surface 258 of the solid portion 256 and the faceplate 300 is repeated for each of the substantially identical columns 210, 212, 214, 216. Since the plurality of columns 210, 212, 214, 216 are equally spaced around the circumference of the assembly 100, the assembly provides strength against tension in the bolt B at any angle.

The accompanying drawings only illustrate one embodiment of a cantilever fastener assembly and its respective constituent parts, however, other types and styles are possible, and the drawings are not intended to be limiting in that regard. Thus, although the description above and accompanying drawings contain much specificity, the details provided should not be construed as limiting the scope of the embodiments but merely as providing illustrations of some of the presently preferred embodiments. The drawings and the description are not to be taken as restrictive on the scope of the embodiments and are understood as broad and general teachings in accordance with the present invention. While the present embodiments of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. A fastener assembly for solidifying an opening in a substrate that has an inside surface and an outside surface, the assembly comprising:
   a body having a column that extends between a proximal end and a distal end and includes a wing section, a middle section, and a lower section;
   a faceplate connected to the column at the distal end that is adaptable to secure the fastener assembly to the outside of the substrate; and
   a cup connected to the column at the proximal end that is adaptable to exert a force on the body in a direction of the faceplate,
   wherein the lower section includes a portion that is adaptable to bend in response to an application of a force on the cup in the direction of the substrate, and a surface that is adaptable to press against the inside surface of the substrate, opposite the faceplate when the fastener assembly is in an actuated state,
   wherein the column includes a first connector, a second connector and a third connector that are each adaptable to bend in response to the application of the force, the first connector includes a groove formed in the outside of the assembly, the second connector includes a groove on the outside of the assembly and the third connector includes a groove on the inside of the assembly, and
   wherein, when the fastener assembly is in an unactuated state, prior to the application of the force, a circumference of the body is limited to be no greater than a circumference of the cup.

2. The fastener assembly of claim 1, wherein, in the actuated state, after an application of force, an outer surface of the middle section is adapted to be positioned parallel and adjacent to the inside surface of the substrate.

3. The fastener assembly of claim 2, wherein the wing section meets an inner surface of the middle section that is opposite the inner surface of the middle section that is adapted to press against the inside surface of the substrate at an intermediary point of the inner surface of the middle section.

4. The fastener assembly of claim 1, wherein the portion of the lower section that is adaptable to bend is slotted.

5. The fastener assembly of claim 1, wherein the middle section is smaller than the wing section and the lower section.

6. The fastener assembly of claim 1, further comprising a top section positioned at the proximal end of the column and connected to the cup.

7. The fastener assembly of claim 1, wherein the column includes a plurality of substantially identical columns.

8. The fastener assembly of claim 1, wherein the column includes four substantially identical columns.

9. The fastener assembly of claim 1, wherein, an inner surface of the middle section contacts an outer surface of the lower section when the fastening assembly is in an actuated state, solidifying the opening in the substrate.

10. A method of applying a fastener assembly to solidify an opening formed in a substrate having an inside surface and an outside surface, the method comprising the steps of:
    providing a fastener assembly comprising a body having a column that extends between a proximal end and a distal end and includes a wing section, a middle section, and a lower section;
    a faceplate connected to the column at the distal end that is adaptable to secure the fastener assembly to the outside of the substrate; and
    a cup connected to the column at the proximal end that is adaptable to exert a force on the body in a direction of the faceplate,
    wherein the lower section includes a portion that is adaptable to bend in response to an application of a force on the cup in the direction of the substrate, and a surface that is adaptable to press against the inside surface of the substrate, opposite the faceplate when the fastener assembly is in an actuated state,
    wherein the column includes a first connector, a second connector and a third connector that are each adaptable to bend in response to the application of the force, the first connector includes a groove formed in the outside of the assembly, the second connector includes a groove on the outside of the assembly and the third connector includes a groove on the inside of the assembly, and
    wherein, when the fastener assembly is in an unactuated state, prior to the application of the force, a circumference of the body is limited to be no greater than a circumference of the cup,
    positioning the faceplate adjacent to the outside surface of the substrate
    inserting the column into the opening in the substrate until the faceplate is positioned against the outside of the substrate;
    positioning a bolt substantially inside the fastener assembly, engaging the threads of the bolt with the cup, and rotating the bolt; and
    adjusting the lower section, the middle section and the wing section to secure the fastener assembly to the inside of the substrate.

11. The method of claim 10, wherein the adjusting step includes moving the middle section outward until the inside surface of the middle section faces the substrate.

* * * * *